Dec. 3, 1940.   I. JEPSON ET AL   2,223,450
COFFEE MAKER
Filed Aug. 23, 1937   3 Sheets-Sheet 1

Inventors:
Ivar Jepson &
Eric Bylund
By McCanna, Wintercorn & Morsbach
Attys

Dec. 3, 1940.     I. JEPSON ET AL     2,223,450
COFFEE MAKER
Filed Aug. 23, 1937     3 Sheets-Sheet 2
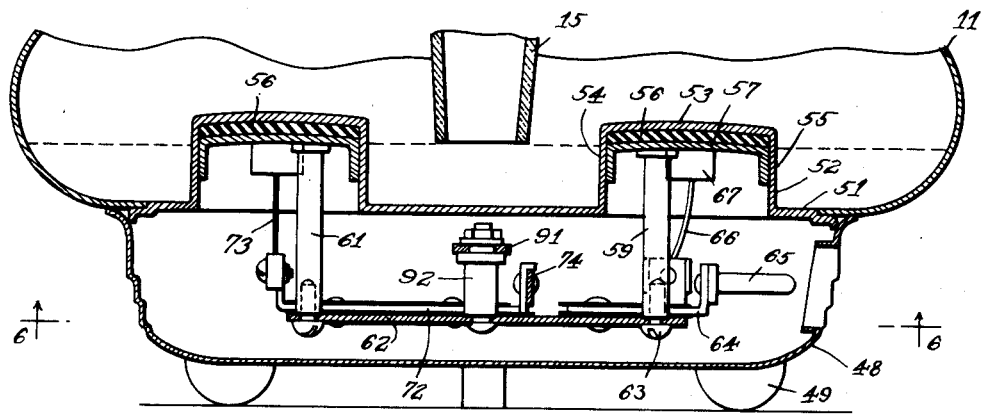
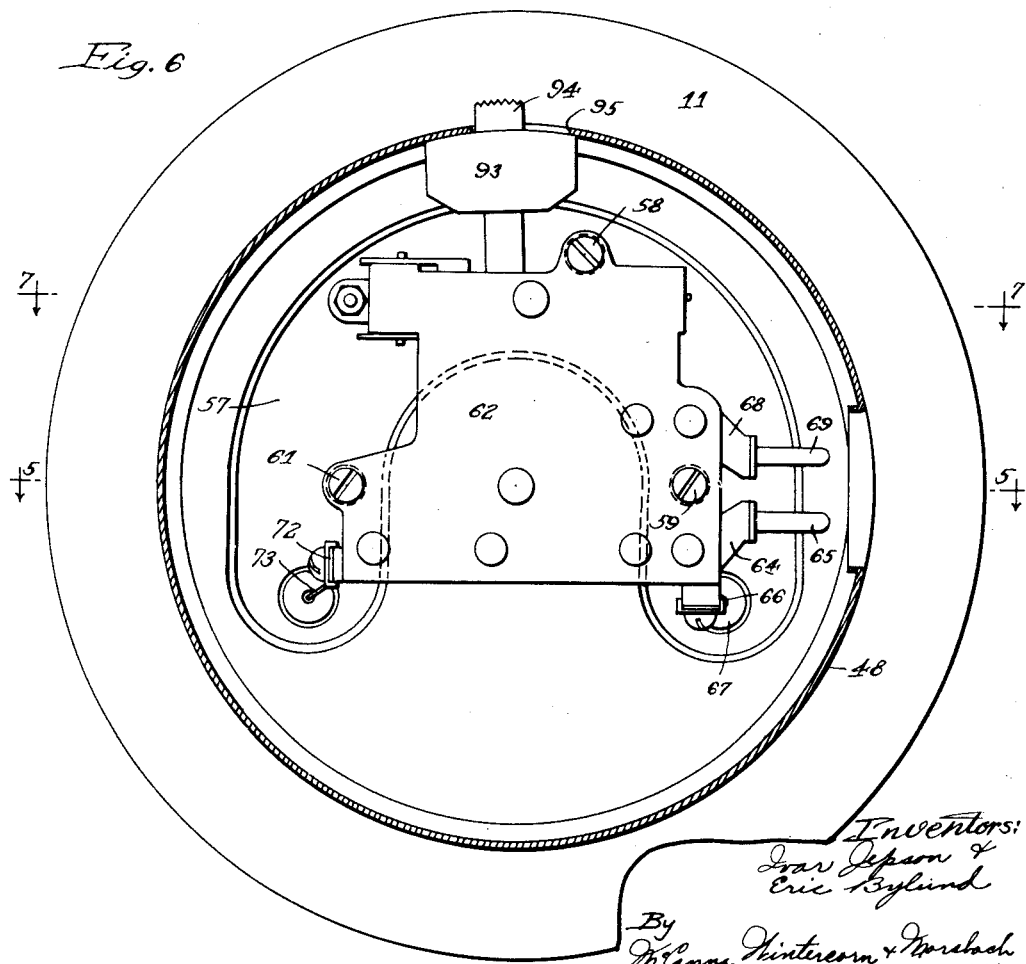
Inventors:
Ivar Jepson &
Eric Bylund
By
McCanna, Wintercorn & Morsbach
Attys.

Dec. 3, 1940.     I. JEPSON ET AL     2,223,450
COFFEE MAKER
Filed Aug. 23, 1937     3 Sheets-Sheet 3

Inventors:
Ivar Jepson &
Eric Bylund
By
McCanna, Hintereorn & Morsbach
Attys.

Patented Dec. 3, 1940

2,223,450

UNITED STATES PATENT OFFICE 2,223,450

COFFEE MAKER

Ivar Jepson and Eric Bylund, Chicago, Ill., assignors to Chicago Flexible Shaft Company, Chicago, Ill., a corporation of Illinois Application August 23, 1937, Serial No. 160,382

14 Claims. (Cl. 219—43)

This invention relates to extraction or infusion apparatus, and has special reference to a coffee maker of the vacuum type wherein the water is forced by steam pressure from a pot up into a coffee chamber or container from which the liquid is returned by cooling of the pot and the resultant reduction in pressure, the coffee grounds being filtered or strained out as the liquid returns to the pot.

Heretofore coffee makers of the vacuum type have been designed with the view to making them automatic in operation in the sense that the heating operation may be started and it will be automatically terminated at the proper time without depending upon the attention or memory of the person operating the device. We have found, however, that structures heretofore provided have not been altogether satisfactory, particularly in that they have not provided for accurately controlling the duration of the brewing period. As a consequence, the operation is variable to such a degree as to be inimical to the making of uniformly good coffee.

In our invention we have discovered the need for accurate control not only of the termination of the heating operations, but also the starting of the heating operation with relation to the time when the water is displaced from the lower pot into the upper coffee making container. Our invention provides means for effecting controlled operation of this character.

Another object of our invention is to provide an improved automatic coffee maker of the character described.

Another object of the invention is the provision of means for more accurately controlling the coffee brewing time to thereby enable the making of better coffee.

Another important object of the invention is the provision of a device of the character described wherein the heating element is turned off in response to the passage of the water out of the pot and into the coffee container, wherein improved means are provided for performing this function, wherein the walls of the pot are prevented from becoming excessively hot, wherein the space relationship between the pot and the coffee container is maintained uniform and definite through successive operations of the device, wherein the switch and switch actuating mechanism is so arranged that the heating elements may be employed for the making of the beverage and for heating the beverage subsequent to its manufacture, and wherein improved means are provided for sealing the junction between the pot and the coffee container to produce a steam-tight joint.

Other objects and advantages will become apparent from the following description and the accompanying drawings, in which—

Fig. 5 is a fragmentary vertical section through the center of the pot on the line 5—5 of Fig. 6;

Fig. 6 is a section on the line 6—6 of Fig. 5 showing the supporting plate for the switch and switch actuating mechanism;

Figure 1:
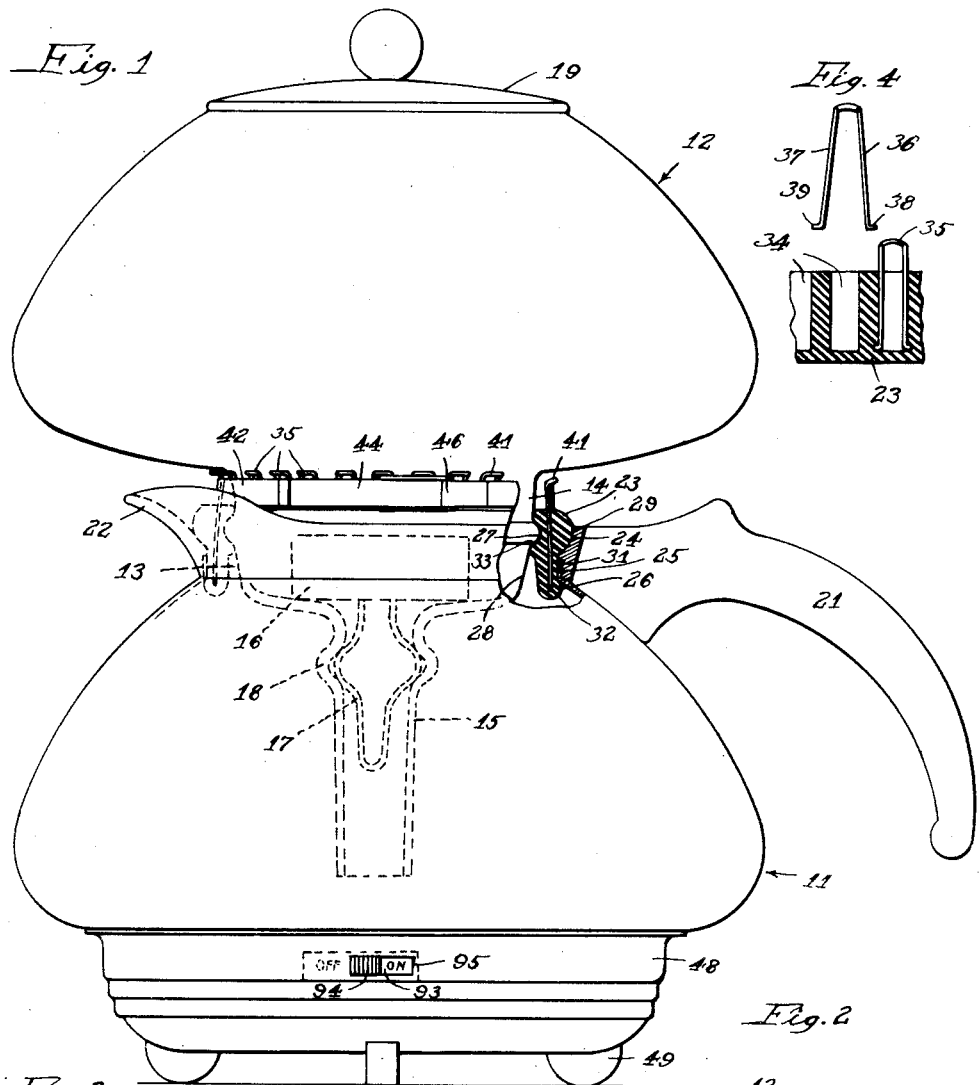
Figure 1 is an elevation partly in section of a coffee maker embodying our invention showing the gasket in the closed position.

Figure 1 shows a coffee maker of the general contemplated comprising a pot 11 and a coffee container 12, the pot having a relatively wide neck as shown at 13, and the coffee container having a depending tube including a relatively large upper portion 14, slightly smaller in outside circumference than the neck 13, and a lower portion 15 adapted to extend downwardly into spaced relation with the bottom of the pot, as will presently be more fully described. A strainer or filter 16 is positioned within the portion 14 and has depending spring prongs 17 adapted to engage an enlargement 18 of the tube to retain the filter in place. In this instance the pot 11 is preferably of metal, whereas the coffee container 12 may advantageously be of glass as common in conventional practice, though not necessarily so. A cover 19 is seated on the top of the container 12 and is of such size as to act as a closure for the top of the container 12 and for the opening 13 of the pot after the coffee has been made and the container 12 removed from the pot. The pot 11 has a handle 21 and a lip 22 diametrically opposed thereto for use in serving the brew from the pot 11.

Figure 4:
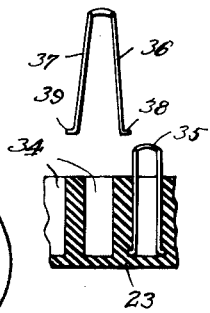
Fig. 4 is a fragmentary section through the gasket showing the manner in which the wire fingers are inserted therein.

A gasket 23 of highly resilient material such as rubber, in the form of a ring or cylinder, is positioned between the tube portion 14 and the opening 13 of the pot. The tube portion 14 and the neck 13 have shape characteristics facilitating the use of the gasket consisting of an arcuate portion 24 adjacent the upper edge of the neck, a cylindrical portion 25 therebelow, and a shoulder 26 below the cylindrical portion 25 defining the lower edge of the neck in this instance. The tube portion 14 is provided with an annular rib 27 and a portion 28 of reduced radius. The gasket 23 is likewise provided on its outer side with an arcuate surface 29 for cooperation with the portion 24, a substantially cylindrical portion 31 adapted to seat against the portion 25 and an outwardly curved edge portion 32 adapted to seat under the shoulder 26, as shown in Figure 1. The inner surface of the gasket is provided with a recess 33 for reception of the rib 27 to retain the gasket on the coffee chamber. The gasket 23 is provided with annularly spaced recesses 34 extending downwardly from its upper edge and terminating short of the lower edge, as best shown in Fig. 4, within which are positioned a plurality of wire fingers 35 in the general form of a U having spaced legs 36 and 37 provided with prongs 38 and 39 at their lower ends, the legs normally having a spring tension outward and being compressed for insertion into the recesses 34, as shown in Fig. 4. When completely inserted into the recesses, the legs 36 and 37 are allowed to expand whereby the prongs 38 and 39 get into and become seated in the rubber of the gasket. The upper ends of the legs 36 and 37 are bent outwardly as shown at 41 and serve as abutments for a compression band 42 seated against the fingers between the abutments 41 and the upper edge of the gasket proper.

Figure 2:
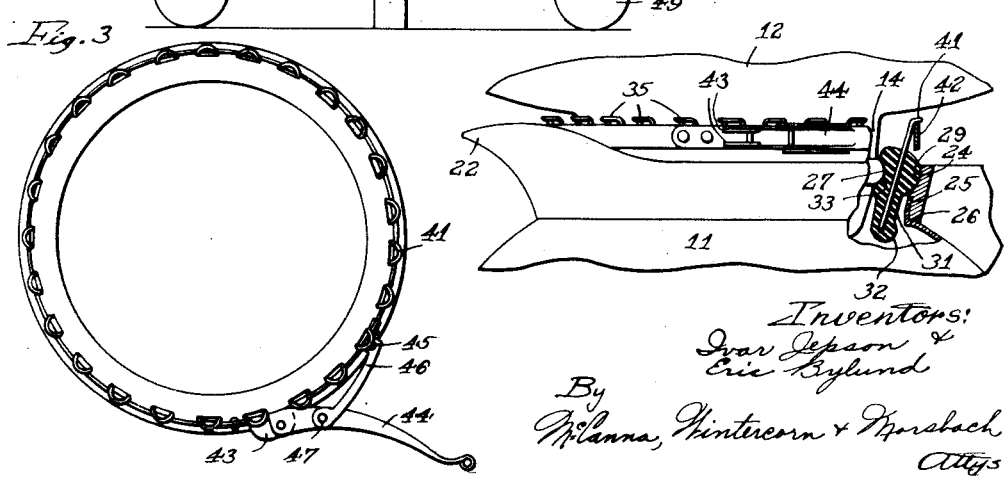
Fig. 2 is a fragmentary view similar to Figure 1 showing the gasket mechanism in the open position.
Figure 3:
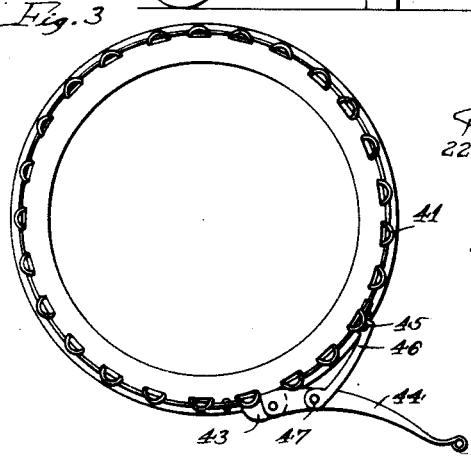
Fig. 3 is a top view of the gasket and its actuating mechanism.

The band 42 comprises a narrow band of spring metal overlapping at its ends having spaced ears 43 spaced from one end for the pivotal support of a lever 44 and a pin 45 at the opposite end thereof for pivotal support of a link 46, the opposite end of the link 46 being pivotally attached to the lever 44 at 47 whereby upon rotation of the lever 44 from the position shown in Figs. 2 and 3 to the position shown in Figure 1, the gasket is moved from the open position to the closed position, as shown in Figs. 1 and 2. It will be seen that in the open position as shown in Fig. 2 the coffee container and gasket may be freely lifted from the pot, and likewise is freely seated thereon in assembling the container on the pot. Likewise, the shape characteristics of the pot, coffee container and gasket serve to definitely locate the container with respect to the pot. When the handle 44 is moved in a clockwise direction facing Fig. 3 until it lies along the side of the band as shown in Figure 1, the fingers 35 are drawn inward, forcing the lower edge 32 of the gasket outward under the shoulder 26 and pressing the outer surface of the gasket against this shoulder and the portion 25. Simultaneously the upper end of the gasket is forced inwardly and the inner surface of the gasket pressed against the depending tube portion 14, thus producing a steam-tight joint between the pot and the container, and at the same time definitely locating the container on the pot, particularly so far as elevation is concerned, whereby to produce a uniform space relation between the bottom of the pot, the heating element, and the bottom end of the tube 15, as will presently be described.

The pot 11 is preferably of metal, and in this particular instance is of so-called German silver, though any suitable metal may be used, in which instance it is necessary to so proportion the parts of the pot and heating element as to compensate for the difference in thermal conductivity of the metals. The pot 11 has a base 48 provided with legs 49 for spacing the base from its support. The bottom of the pot 11 in this instance comprises a plate 51 to which the walls of the pot are suitably secured as by welding or otherwise, the plate having a U-shaped recess 52 in its bottom providing an upstanding U-shaped rib 53 within the pot, which in effect forms a centrally disposed well 54 and an annularly disposed well 55 communicating at the open point of the U-shaped rib. The depth of the pot and the length of the tube portion 15 are so proportioned that the lower end of the tube 15 extends below the level of the top of the rib 53, as best shown in Fig. 5. A heating element 56 is positioned in the recess 52 against the top of the rib and is secured therein by a plate 57 pressed into the recess 52, as best shown in Fig. 5. The plate 57 has a plurality of depending pins 58, 59 and 61 attached thereto, to the lower end of which is secured a plate 62 by means of screws 63, the plate serving to support a switch and switch actuating mechanism.

Attached to the plate 62 and insulated therefrom is a bracket 64 which carries one pin 65 of a suitable connector, the bracket being electrically connected to the heating element 56 through a lead 66 which passes through a porcelain insulator 67 positioned in the plate 57. A bracket 68 likewise carries a connector pin 69 and is attached to and insulated from the pin 62. The bracket 68 also carries a contact point 71 electrically connected to the pin 69. A third bracket 72 is positioned on the plate 62 and is electrically connected to the heating element 56 through a lead 73. The bracket 72 is insulated from the plate 62 and carries a leaf spring 74 which has a contact 75 positioned to cooperate with the contact 71. The free end of the spring 74 has a block of insulation material 76 adapted to be contacted, as will presently be described, to separate the contacts 71 and 75. The tension of the spring 74 normally urges the contacts into engagement.

A spacing member 77 and a pair of upstanding ears 78 are carried on the plate 62, and serve to support a sliding member 79. The member 79 has a pair of spaced wings 81 provided with longitudinal slots 82 for the reception of a pin 83 supported in the ears 78, the member 79 and ears 81 having straight line movement on the pin 83. The member 79 also has a slot 84 for the reception of the spacing member 77 upon which the member 79 moves. The member 79 also has a laterally projecting finger 85 opposed to the block 76. A coiled spring 86 acting between the member 79 and an upstanding leg 87 on the plate 62 normally urges the member 79 to the right facing Figs. 7 to 9, causing the finger 85 to abut the block 76 and separate the contact points 71 and 75 and thereby prevent the flow of current through the heating element. The member 79 also has a shoulder portion 88 and an upstanding finger 89 between the wings 81.

Figure 7:
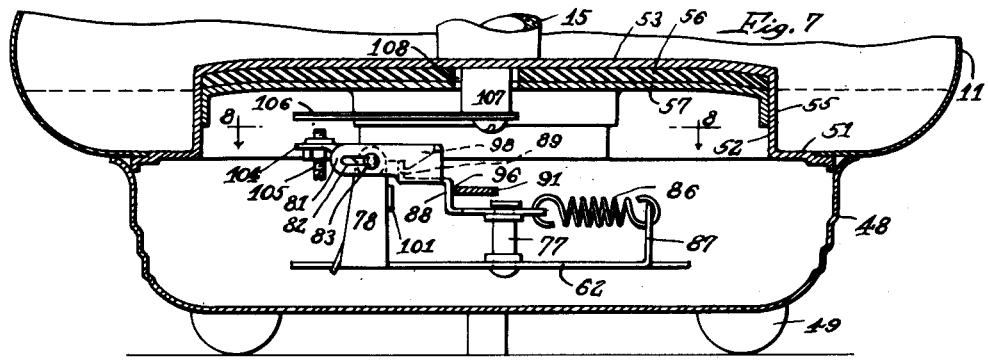
Fig. 7 is a section on the line 7—7 of Fig. 6.
Figure 8:
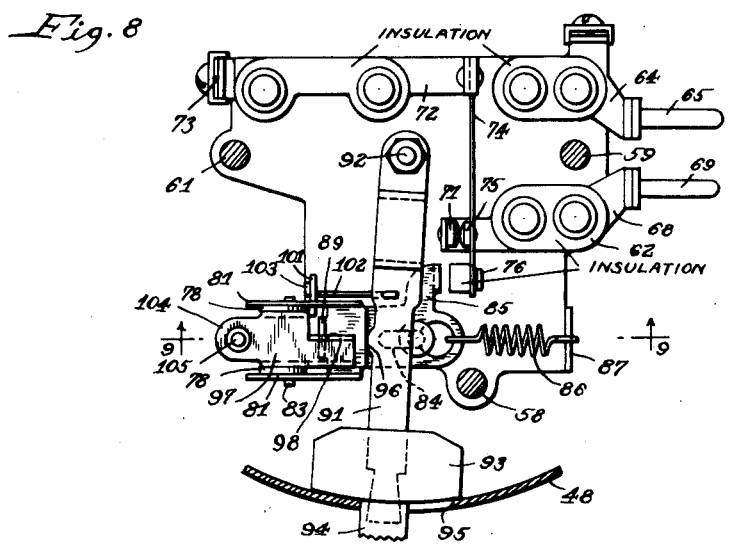
Fig. 8 is a view taken on the line 8—8 of Fig. 7.
Figure 9:
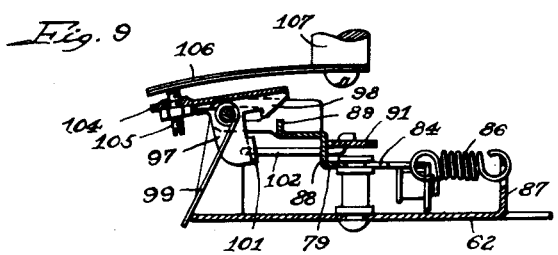
Fig. 9 is a section on the line 9—9 of Fig. 8.

A switch lever 91 is pivotally supported on an upstanding spacing bolt 92 for rotation in a plane parallel to the bottom of the pot, the free end of the lever having a block 93 adapted to bear against the inner surface of the base 48, as shown in Figs. 6 and 8, and an actuating button 94 projecting through a slot 95 in the base 48 for manual movement of the lever. The lever has a curved surface 96 positioned to abut against the shoulder 88, whereby manual movement of the button 94 to the left facing Figs. 7 to 9 moves the member 79 from the position shown in Fig. 9 to the position shown in Fig. 7 against the tension of the spring 86.

Carried on the pin 83 is a latch member designated generally by the numeral 97 having a pawl portion 98 extending toward the lever 91 and adapted to drop over the upstanding finger 89 for the purpose of holding the member 79 in its tensioned position when moved to the left by the lever 91. A spring 99 normally urges the pawl portion 98 downward; that is, the spring moves the latch member in a clockwise direction facing Figs. 7 and 9 so as normally to move the pawl portion 98 into a position for engagement with the finger 89. The latch member 97 also has a downwardly and laterally extending stop portion 101 having a hole for the passage of a link 102 which is fixed to the lever 91 and passes through the stop portion 101, the end 103 thereof being bent at right angles to provide a lost motion connection between the link and the stop portion. The link and stop portion provide means for releasing the member 79 from the pawl portion 98 through actuation of the button 94. Thus, by movement of the button to the right facing Fig. 8, the link operating on the stop portion rotates the latch member 97 in a counterclockwise direction against the tension of the spring 99 releasing the finger 89 from the pawl portion, thereby permitting the portion 79 to move to the right under the tension of the spring 86 and open the contacts 71 and 75.

The latch member 97 has a laterally extending arm 104 carrying an adjusting screw 105 adapted to be engaged by a bimetal thermostat element 106 or other temperature responsive element for the purpose of rotating the latch member 97, releasing the member 79 and thereby separating the contacts 71 and 75 in response to a critical temperature in the pot. The bimetal element 106 is fixedly attached to a lug 107, welded or otherwise thermally attached to the bottom surface of the rib 53, as best shown in Fig. 7, the leg passing through an opening 108 in the heating element 56 and the plate 57.

The operation of the coffee maker is as follows: The requisite amount of water is placed in the pot 11 and the required amount of ground coffee is placed in the coffee container 12 on top of the filter 16. The coffee container, which normally carries the gasket 23, is then seated in the open top of the pot. Because of the interfitting relationship of the parts, it is unnecessary to force the coffee container down into the neck of the pot, and such action is undesirable as will presently be discussed. Thereupon the handle 44 is actuated, drawing the band 42 inward and distorting the lower edge of the gasket outward to seal the joint between the coffee container and the pot. Thereupon the button 94 is moved to the left facing Figs. 1 and 8 to the "on" position, as a result of which the contacts 75 and 71 are closed and the pawl portion 98 engages over the finger 89, retaining the member 79 in the position shown in Figs. 7 and 8. Current then flows through the heating element until the water in the pot is brought to a boil, whereupon the steam pressure within the pot forces the water up through the tube 15 and into the coffee container 12 until the surface of the water comes down to the level of the lower end of the tube 15, as shown in dotted lines in Fig. 5. This uncovers the upper side of the rib 53. Due to the absence of water on the upper side of the rib, the heating element very rapidly heats this portion of the rib to an elevated temperature, which heat is conducted through the lug 107 to the thermostat element 106 causing the same to warp downwardly into contact with the screw 105, subsequently rotating the latch member 97 and releasing the member 79 to open the contacts 71 and 75, thereby terminating the flow of current to the heating element. The pot 11 then cools and upon the condensation of the steam in the pot, reduced pressure obtains in the pot, causing the liquid to be drawn downward from the coffee container through the tube 15 and into the pot. Thereafter, the lever 44 is moved to the position shown in Fig. 2, the coffee container 12 and gasket 23 lifted from the neck of the pot, and the cover 19 moved from the coffee container 12 to the neck of the pot, the coffee container being disposed of in the conventional manner.

Attention is directed to the arrangement of the heating element in the pot and the relationship between the heating element and rib 53 and the lower end of the tube 15. It will be seen that it is necessary to uncover the upper side of the rib 53 when the water is expelled from the pot in order to permit the temperature to continue to rise above the boiling point of water for the actuation of the thermostat element. This rise must be substantial in order to obtain reliable operation of the thermostat. However, the water remaining in the pot functions to cool the rib 53 after the opening of the switch, and thereafter the length of time during which the liquid will remain in the coffee container 12 in contact with the coffee grounds is greatly affected by the amount of residual water. From these circumstances it will be seen to be of the greatest importance that in each successive operation of the coffee maker the end of the tube 15 be brought to the same level within the pot. Only in this way can reliable and consistent operation of the coffee maker be obtained. In order to accomplish this, we have provided a gasket 23 and shape characteristics on the coffee container and on the neck of the pot such as to definitely fix the location of these elements through successive operations of the device, and have provided means for positively sealing this connection. In this way we have eliminated the sliding gaskets heretofore used in coffee makers of this type, wherein the relative positions of the coffee container and the pot vary, depending upon the age of the gasket and the force with which it is pressed into the neck of the pot. In our device no force is necessary and the gasket is not compressed by force applied on the coffee container, but independent means are provided for compressing the gasket and sealing the junction between the parts.

At this time we wish to point out more particularly the manner in which we accurately control the brewing period regardless of whether a greater or lesser number of cups of coffee is being brewed. For purpose of illustration we shall consider the brewing period as starting with the time when substantially all of the liquid has been displaced to the upper container until approximately the time when it discharges down into the pot by the vacuum action. This period is controlled according to our invention by the relation between the water retaining portion in the pot to the heater capacity and the heat conductivity of the material making up the bottom wall of the pot. According to our invention this relationship is definitely established and it is uniformly maintained in successively operations. In the particular example of our invention shown in the drawings, the bottom wall is of German silver as above stated which is of comparatively low thermal conductivity. Because of this low conductivity we employ a well structure having a relatively large water capacity. It will now be noted, viewing Figs. 5 and 7, that the uncovered portion of the bottom wall, that is, the top surface of the rib formation, is crowned. This crowned or inclined surface is definitely so shaped for the purpose of draining all residual water from the top of the heated portion so that no water will be retained on the top surface when the water level is lowered as above described. This top surface is especially so designed with respect to the top wall portion contiguous to the lug 107 through which the bimetal thermostat is directly connected to the bottom wall. This is for the purpose of insuring absolute drainage of all residual water from this area contiguous to the thermostat connection so that there is direct heat transfer from the exposed hottest portion of the bottom wall to the thermostat element. This insures that heat conductivity to the thermostat element will be uniform under all operation conditions; and we have found that it will not be uniform but will vary substantially as to the timing function even upon the presence of a minute quantity of water such for example as a drop or two, at or in the close vicinity to the connection of the thermostat element to the bottom wall. Furthermore, by reason of this feature of construction uniform operation is attained even though the coffee making device does not rest on a level surface. This construction insures that the flow of current to the heating element will be shut off precisely at a critical high temperature in relation to the time at which the water has been raised to the upper vessel. This critical temperature is reached just after the water has been raised to the upper vessel and thus approximately at the start of the brewing period above described. It follows that upon accurately determining the point of shutting off the heater we have established an important factor in controlling the brewing time. Thereafter, the length of time during which the liquid will remain in the upper container in contact with the coffee grounds is controlled by the residual heat in the heater, the conductivity of the bottom wall and the amount of residual water in the well structure. By reason of the controlled relation between the bottom wall and the well capacity, the heat transfer from the uncovered portion of the bottom wall to the remaining water serves as a time control. As a consequence of this cooling action in the lower portion of the pot condensation of any residual steam takes place and the temperature of the air in the pot is lowered, thus producing a partial vacuum. As a result of this low pressure condition within the pot the liquid in the upper container passes down into the pot in a comparatively quick flow.

Attention is also directed to the fact that a well of water is maintained between the rib 53 carrying the heating element and the side walls of the pot. The presence of this water prevents the excessive temperature of the heating element in the last stages of the coffee making operation from being conducted up along the metal walls of the pot to the gasket 23, which excessive heat tends to rapidly deteriorate and damage the gasket. Furthermore, we have arranged the centrally disposed well in communication with the annular well so as to maintain a uniform level therebetween and permit the level of the water in the annular chamber to drop to the level of the water in the central chamber so as to positively expose the entire upper surface of the rib and thus render its operation more reliable.

Attention is further directed to the fact that the switch construction is such that the contacts 71 and 75 may be opened or closed at any time through manual operation of the button 94. In this way the coffee in the pot 11 may be heated subsequent to the making operations by actuation of the button 94, and when the coffee has assumed the proper temperature, the switch may be manually opened. Likewise, during the coffee making operations, the heating element may be turned off at any time to stop the progress of the operation in case of necessity or desire, the whole being incorporated in a single switch actuating mechanism.

While we have thus described and illustrated a specific embodiment of the invention, we are aware that numerous alterations and changes may be made within the spirit of the invention, and we do not wish to be limited except as required by the prior art and the scope of the appended claims, in which we claim:

1. The combination in a vacuum type coffee maker of a pot having an open top, an electrical heating element positioned above the bottom of the pot to provide a centrally disposed well and an annular well communicating therewith, the top portion of the heating element being shaped to drain all residual water into the wells, switch means for controlling the flow of current to the heating element, manually operable means for closing and opening said switch, thermostat means for opening said switch in response to increase of temperature of said heating element when the same is out of contact with water, a coffee container having a tube extending through the top of the pot and into said centrally disposed well, and means acting between the container and the top of the pot for securing the same together in steam tight relationship and locating the tube with respect to the well.

2. The combination in a vacuum type coffee maker of a pot having an open top, an electrical heating element positioned above the bottom of the pot to provide a centrally disposed well, a coffee container having a tube adapted for reception through the top of the pot to a predetermined depth in said well to conduct water out of said well to a predetermined depth in response to steam pressure in said pot to expose the heating element, gasket means interposed between the pot and the tube for securing the same together in steam tight relationship having shape characteristics for locating the tube at said predetermined depth upon repeated insertions thereof, and thermally operated switch means responsive to said heating element for terminating the flow of current when the latter is uncovered, wherein the heating element is spaced from the walls of the pot to provide an annular well for retaining water throughout the operation of the coffee maker to serve as a heat barrier and prevent the walls of the pot from becoming excessively heated and damaging the gasket.

3. The combination in a coffee maker of the type having a pot provided with a bottom portion adapted to be uncovered upon displacement of water from the pot and electrical heating elements in said portion, said bottom portion being shaped to drain off all residual water, a switch for controlling the flow of current through the heating element, thermostat means responsive to the increase in temperature of said bottom portion resulting from said portion being uncovered to automatically terminate the operation of said heating element in response to the displacement of water from the pot, and manually operative means for closing said switch and for opening the switch independently of said thermostat means to manually terminate the operation of the heating element.

4. The combination in a coffee maker, of a coffee container having a depending tube for the passage of water thereto, a pot having an open top for the reception of said tube in steam tight relationship, a raised rib in the bottom of said pot forming a well and having a top portion shaped to drain all residual water into said well, a heating element disposed in said rib, a thermostat element responsive to the temperature of said top portion of said rib, a switch normally biased to the closed position, means tensioned to normally open said switch, latch means for retaining said means in the closed position of the switch positioned to be released by said thermostat element at an elevated temperature, and manually operative means for moving said means to open and close the switch.

5. The combination in a coffee maker, of the type having a pot provided with a bottom portion adapted to be uncovered upon the displacement of water therefrom, said bottom portion being shaped to drain off all residual water, an electrical heating element in said portion, a switch normally biased to the closed position to control the flow of current to the heating element, a member operative thereon to move the switch between open and closed positions tensioned to open the switch, latch means for holding said member in the closed position of the switch, thermostat means responsive to said bottom portion for releasing said latch in response to the increase in temperature thereof when uncovered, to open the switch, and manually operable means for moving said member to the latched position and for releasing the latch.

6. The combination in a coffee maker of the type having a pot provided with a bottom portion adapted to be uncovered upon the displacement of water from the pot, said bottom portion being shaped to drain off all residual water, an electrical heating element in said portion, a member movable between limiting positions, switch means engaged by said member for movement between open and closed positions upon movement of said member between said limiting positions, spring means for moving said member to one of said limiting positions to open said switch, a normally operable lever rotatable in one direction for moving said member to the other of said limiting positions to open said switch, said lever being rotatable in the opposite direction independently of said member, a latch member for holding said member in said other limiting position against the tension of said spring, means for releasing said latch in response to rotation of said lever in said opposite direction to manually open said switch, and thermostat means responsive to a rise in temperature of said bottom portion substantially above the boiling point of water for releasing said latch to open said switch.

7. The combination in a vacuum type coffee maker of a pot having a bottom provided with an upstanding rib in the form of a U providing central and annularly disposed communicating wells, a heating element positioned therein, a coffee container seated on said pot having a tube extending into the central well to a point below the upper edge of said rib, and thermostat means responsive to the temperature of the upper edge of said rib for terminating the flow of current to the heating element in response to displacement of water from the pot to a level below the upper edge of said rib, said annularly disposed well preventing the walls of the pot from becoming excessively heated.

8. The combination in a vacuum type coffee maker of a pot having an open top, an electrical heating element positioned above the bottom of the pot to provide a centrally disposed well, said heating element being spaced from the walls of the pot to provide an annular well for retaining water throughout the operation of the coffee maker to serve as a heat barrier and prevent the walls of the pot from becoming excessively heated and damaging the gasket, a coffee container having a tube adapted for reception through the top of the pot to a predetermined depth in said well to conduct water out of said well to a predetermined depth in response to steam pressure in said pot to expose the heating element, gasket means interposed between the pot and the tube for securing the same together in steam tight relationship having shape characteristics for locating the tube at said predetermined depth upon repeated insertions thereof, and thermally operated switch means responsive to said heating element for terminating the flow of current when the latter is uncovered.

9. In a vacuum type coffee maker, a pot having a bottom wall providing a well and a top portion contiguous to said well adapted to be uncovered upon the displacement of water from the pot, said top portion being shaped so that all residual water will drain from the top thereof into said well, a heating element directly associated with the bottom wall for heating the pot and causing said displacement of water therefrom, and thermostat means responsive to the temperature of said uncovered contiguous portion of the bottom wall for terminating the flow of current to the heater in response to displacement of water from the pot to a level below said top portion of the bottom wall.

10. A vacuum type coffee maker as set forth in claim 9, in which the bottom wall is further shaped to provide a second well circumscribing the top portion which is adapted to be uncovered, said second well serving as a heat barrier to prevent the upright walls of the pot from becoming excessively heated.

11. In a vacuum type coffee maker, a pot having a bottom wall providing a central well and an outer annular well and an intermediate wall portion adapted to be uncovered upon the displacement of water from the pot, said wall portion being shaped so that all residual water will drain from the top thereof into said wells, means providing communication between the wells so that the water therein will have a common level, a heating element directly associated with said wall portion for heating the pot and causing said displacement of water therefrom, and thermostat means responsive to the temperature of said uncovered portion of the bottom wall for terminating the flow of current to the heater in response to displacement of water from the pot to a level below the top of said wall portion.

12. A vacuum type coffee maker having a lower and an upper vessel, the lower vessel having a bottom wall provided with a portion adapted to be uncovered upon displacement of the water from the lower vessel to the upper vessel and provided also with a depressed portion to retain a given amount of water for cooling said bottom wall, an electric heater for heating said bottom wall, a thermostat device responsive to the temperature of said uncovered portion of the bottom wall for terminating the flow of current to the heater, the relation between the water retaining portion to the heat capacity and the heat conductivity of the material in the bottom wall being such that cooling of the bottom wall will take place at such rate that the brew will return to the lower vessel a predetermined length of time after said terminating of the current.

13. In an automatic coffee maker of the type having a pot provided with a bottom portion adapted to be uncovered upon the displacement of water from the pot, a well in the bottom of the pot, said bottom portion shaped to provide a top surface inclined so that all residual water will drain into said well, an electric heater positioned directly against the underside of said bottom portion, a thermally responsive device located at the exterior of the pot and having good thermal connection with said inclined bottom portion whereby to be quickly responsive to temperature change of the uncovered portion, a circuit for energizing said electric heater, and means actuated by said thermally responsive device to control the flow of current through the electric heater to automatically terminate the operation of said electric heater at a critical temperature resulting from displacement of the water from the pot and particularly from said uncovered inclined portion of the bottom.

14. In a vacuum type coffee maker, a pot having a bottom wall provided with an upstanding rib providing central and annularly disposed communicating wells, the top portion of said rib adapted to be uncovered upon displacement of water from the pot, said top portion being shaped so that all residual water will drain from the top surface thereof into said wells, a heating element disposed within said rib portion and having direct thermal connection with the top portion thereof adapted for heating water in the pot and causing displacement of water therefrom for coffee-making, and thermostat means responsive to the temperature of the uncovered top portion of the rib for terminating the flow of current to the heater when a critical temperature is reached in response to displacement of water from the pot to a level below said top portion.

IVAR JEPSON.
ERIC BYLUND.